United States Patent [19]

Tomaschke

[11] Patent Number: 4,872,984
[45] Date of Patent: Oct. 10, 1989

[54] INTERFACIALLY SYNTHESIZED REVERSE OSMOSIS MEMBRANE CONTAINING AN AMINE SALT AND PROCESSES FOR PREPARING THE SAME

[75] Inventor: John E. Tomaschke, San Diego, Calif.

[73] Assignee: Hydranautics Corporation, San Diego, Calif.

[21] Appl. No.: 250,190

[22] Filed: Sep. 28, 1988

[51] Int. Cl.⁴ .............................................. B01D 13/00
[52] U.S. Cl. ................................ 210/500.38; 264/45.5
[58] Field of Search .................. 210/500.38, 654, 490, 210/420, 475, 500.37, 500.39; 528/312, 363; 264/41, 45.1, 45.5, 48; 427/386, 385.5, 393.5, 412.1, 412.2, 412.3, 412.4, 412.5

[56] References Cited

U.S. PATENT DOCUMENTS 4,277,344  7/1981  Cadotte ......................... 210/500.38
4,761,234  8/1988  Uemura et al. ................ 210/500.38
4,769,148  9/1988  Fbiger et al. .................. 210/500.38

Primary Examiner—Frank Sever
Attorney, Agent, or Firm—Sughrue, Mion, Zinn, Macpeak, and Seas

[57] ABSTRACT

The present invention relates to an interfacially synthesized reverse osmosis membrane useful for the separation of fluid mixtures and solutions. In particular, the present invention relates to an aromatic polyamide water permeable membrane containing an amine salt therein, which is useful for desalination of an aqueous solution. The present invention also relates to processes for preparing the membrane.

58 Claims, No Drawings

4,872,984

INTERFACIALLY SYNTHESIZED REVERSE OSMOSIS MEMBRANE CONTAINING AN AMINE SALT AND PROCESSES FOR PREPARING THE SAME

FIELD OF THE INVENTION

The present invention relates to an interfacially synthesized reverse osmosis membrane useful for the separation of fluid mixtures and solutions. In particular, the present invention relates to an aromatic polyamide water permeable membrane containing an amine salt therein, which is useful for desalination of an aqueous solution. The present invention also relates to processes for preparing the membrane.

BACKGROUND OF THE INVENTION

It is known that dissolved substances can be separated from their solvents by use of selective membranes. For example, of great practical interest is the removal of salt from water by reverse osmosis. The efficiency and economy of such removal is of tremendous economic significance in order to provide potable water from brackish or sea water for household or agricultural use. A critical factor in desalination is the performance of the membrane in terms of salt rejection, i.e., the reduction in salt concentration across the membrane, and flux, i.e., the flow rate across the membrane. For practical applications, the flux should be on the order of greater than about 10 gallons/ft$^2$-day (gfd) at a pressure of about 55 atmospheres for sea water and about 15 gfd at a pressure of about 15 atmospheres for brackish water. The continuing goal of research and development in this area is to develop membranes having increased flux and/or salt rejection which are useful in desalination.

Among the known membranes used in desalination are included a large number of various types of polyamides which are prepared by a variety of methods.

Of particular interest within this broad group of polyamide membranes are crosslinked aromatic polyamide membranes. The crosslinked aromatic polyamide membranes include, for example, those disclosed in the following U.S. Patents.

U.S. Pat. No. 3,904,519, issued to McKinney et al, discloses reverse osmosis membranes of improved flux prepared by crosslinking aromatic polyamide membranes using crosslinking agents and/or irradiation. The polyamides are prepared, for example, by the interfacial polymerization of amine groups and carboxyl groups followed by crosslinking.

U.S. Pat. No. 3,996,318, issued to van Heuven, teaches the production of aromatic polyamide membranes, wherein crosslinking is achieved using a reactant having a functionality of three or greater.

U.S. Pat. No. 4,277,344, issued to Cadotte, describes a reverse osmosis membrane which is the interfacial reaction product of an aromatic polyamine having at least two primary amine substituents with an aromatic acyl halide having at least three acyl halide substituents. The preferred membrane is made of a poly(phenylenediamine trimesamide) film on a porous polysulfone support.

U.S. Pat. No. 4,529,646, issued to Sundet, shows a similar membrane in which all or a portion of the trifunctional aromatic acyl halide is replaced by cyclohexane—1,3,5-tricarbonyl chloride. Similar membranes are disclosed in U.S. Pat. Nos. 4,520,044, 4,544,484 and 4,626,468, each issued to Sundet.

U.S. Pat. No. 4,661,254, issued to Zupanic et al, discloses a reverse osmosis composite membrane formed by the interfacial polymerization of a triaryl triamine with an aromatic carboxylic acid chloride.

While some of the above referenced membranes are commercially useable, the goal of the industry continues to be to develop membranes that have better flux and salt rejection characteristics in order to reduce costs and increase efficiency of operation.

SUMMARY OF THE INVENTION

Accordingly, an object of the present invention is to provide an interfacially synthesized reverse osmosis membrane which has high salt rejection and excellent flux.

This and other objects of the present invention, which will be apparent from the detailed description of the present invention provided hereinafter, have been met by a water permeable membrane prepared by interfacially polymerizing, on a microporous support, (1) an essentially monomeric, aromatic polyamine reactant having at least two amine functional groups, and (2) an essentially monomeric, aromatic, amine-reactive reactant comprising a polyfunctional acyl halide or mixture thereof, wherein the amine-reactive reactant has, on the average, at least about 2.2 acyl halide groups per reactant molecule, in the presence of (3) an amine salt.

In one embodiment of the present invention, a solution containing an amine salt and an aromatic polyamine is coated on a microporous support prior to coating with a solution of an aromatic polyfunctional acyl halide.

In a second embodiment of the present invention, an amine salt solution is coated on a microporous support prior to coating with an aromatic polyamine solution and an aromatic polyfunctional acyl halide solution.

The resulting membrane consists of an ultrathin membrane on the microporous support. This membrane has excellent salt rejection and flux and is suitable for desalination applications.

DETAILED DESCRIPTION OF THE INVENTION

In one embodiment, the objects of the present invention have been met by a water permeable membrane produced by the process comprising the steps of:

(a) coating a microporous support with an aqueous solution comprising (i) an essentially monomeric, aromatic, polyamine reactant having at least two amine functional groups and (ii) an amine salt, to form a liquid layer on said microporous support;

(b) contacting said liquid layer with an organic solvent solution of an essentially monomeric, aromatic, amine-reactive reactant comprising a polyfunctional acyl halide or mixture thereof, wherein the amine-reactive reactant has, on the average, at least about 2.2 acyl halide groups per reactant molecule; and (c) drying the product of step (b) so as to form said water permeable membrane.

In a second embodiment, the water permeable membrane is produced by the process comprising the steps of:

(a) coating a microporous support with a first aqueous solution comprising an amine salt to form an amine salt layer on said microporous support;

(b) coating said amine salt layer with a second aqueous solution comprising an essentially monomeric, aromatic, polyamine reactant having at least two amine functional groups to form a liquid layer on said amine salt layer;
(c) coating said liquid layer with an organic solvent solution of an essentially monomeric, aromatic, amine-reactive reactant, comprising a polyfunctional acyl halide or mixture thereof, wherein the amine-reactive reactant has, on the average, at least about 2.2 acyl halide groups per reactant molecule; and
(d) drying the product of step (c) so as to form said water permeable membrane.

The particular microporous support employed in the present invention is not critical thereto. Examples of such microporous supports useful in the present invention include those made of a polyarylether sulfone, such as a polysulfone and a polyether sulfone; a polyimide; and a polyvinylidene fluoride. The microporous support is preferably made of a polyarylether sulfone.

The thickness of the microporous support is not critical to the present invention. Generally, the thickness of the microporous support is about 25 to 125 μm, preferably about 40 to 75 μm.

The essentially monomeric, aromatic, polyamine reactant employed in the present invention has at least two amine functional groups, preferably 2 to 3 amine functional groups. The amine functional group is a primary or secondary amine functional group, preferably a primary amine functional group.

The particular polyamine reactant employed in the present invention is not critical thereto. Examples of such polyamine reactants include aromatic primary diamines, such as m-phenylenediamine and p-phenylenediamine and substituted derivatives thereof, wherein the substituent includes, e.g., an alkyl group, such as a methyl group or an ethyl group; an alkoxy group, such as a methoxy group or an ethoxy group; a hydroxy alkyl group; a hydroxy group or a halogen atom; cycloaliphatic primary diamines, such as cyclohexane diamine; cycloaliphatic secondary diamines, such as piperizine and trimethylene dipiperidine; aromatic secondary diamines, such as N,N'-diphenylethylene diamine; and xylylene diamine. The preferred polyamine reactants employed in the present invention are aromatic primary diamines, more preferably m-phenylenediamine.

The essentially monomeric, aromatic, amine-reactive reactant has, on the average, at least 2.2 polyfunctional acyl halide groups, preferably 2.2 to 3.0 polyfunctional acyl halide groups per reactant molecule.

The particular amine-reactive reactant employed in the present invention is not critical thereto. Examples of such amine-reactive reactants include isophthaloyl halide, trimesoyl halide, terephthaloyl halide and mixtures thereof. The preferred amine-reactive reactants employed in the present invention are isophthaloyl chloride (IPC) and trimesoyl chloride (TMC).

The amine salt employed in the present invention maybe a salt of an amine and an acid, and is preferably a salt of a tertiary amine and a strong acid.

As used herein, a strong acid is an acid which reacts essentially completely with water to give a hydronium ion.

Examples of such strong acids include an aromatic sulfonic acid; an aliphatic sulfonic acid; a cycloaliphatic sulfonic acid, such as camphorsulfonic acid; trifluoroacetic acid; nitric acid; hydrochloric acid; and sulfuric acid.

The particular amine salt employed in the present invention is not critical thereto and may be any aliphatic, alkoxy, cycloaliphatic, heterocyclic or alkanol amine salt.

Preferred amine salts employed in the invention are represented by formula (I) and (II) below:

  (I)

  (II)

wherein $R_1$, $R_2$, $R_3$ and $R_4$, which may be the same or different, each represents a hydrocarbon; X represents a member selected from the group consisting of a halide, a nitrate, a sulfate, a phosphate, a sulfonate, a carboxylate, a halogenated carboxylate and an oxygenated haloacid derivative; and HX represents a strong acid which forms a water soluble salt with

In formula (I), the hydrocarbons represented by $R_1$, $R_2$ and $R_3$ preferably have a total number of carbon atoms of 3 to 9, more preferably, 3 to 6. In formula (II), the hydrocarbons represented by $R_1$, $R_2$, $R_3$ and $R_4$, preferably have a total number of carbon atoms of 4 to 16, more preferably, 4 to 13. The hydrocarbon may be, e.g., a straight or branched chain substituted or unsubstituted alkyl group, alkoxy group, alkanol group or benzyl group. Further, in formula (I), two or more of $R_1$, $R_2$ and $R_3$ may combine together to form a ring.

More preferably, the amine salt employed in the present invention is a water soluble salt of a strong acid and a tertiary amine selected from the group consisting of a trialkylamine, such as trimethylamine, triethylamine, tripropylamine; an N-alkylcycloaliphatic amine, such as 1-methylpiperidine; an N,N-dialkylamine, such as N,N-dimethylethylamine and N,N-diethylmethylamine; an N,N-dialkyl ethanolamine, such as N,N-dimethylethanolamine; a bicyclic tertiary amine, such as 3-quinuclidinol and mixtures thereof, or a quaternary amine selected from at least one member of the group consisting of a tetraalkylammonium hydroxide, such as, tetramethylammonium hydroxide, tetraethylammonium hydroxide, and tetrapropylammonium hydroxide; a benzyltrialkylammonium hydroxide, such as benzyltrimethylammonium hydroxide, benzyltriethylammonium hydroxide, and benzyltripropylammonium hydroxide; and mixtures thereof.

The amine salt is employed either as a solid, which is water soluble, or as an aqueous solution having dissolved therein the amine salt. The amine salt is preferably employed as an aqueous solution thereof.

The amine used to prepare the amine salt preferably has a pKa of more than about 8, more preferably about 8 to 13, most preferably about 9 to 13.

In one embodiment of the present invention, the microporous support is coated with a first aqueous solution containing generally about 0.25 to 10.0 wt % of an amine salt, preferably about 1.0 to 8.0 wt % of an amine salt. The first aqueous solution is preferably adjusted to a pH of about 5.5 to 9, more preferably about 7 to 8, by controlling the concentration of the acid or the amine salt. In this case, the second aqueous solution containing the polyamine reactant generally has a pH of about 5 to 10, preferably about 7 to 9. Further, in this case, where the amine salt and the polyamine reactant are separately coated on the microporous support, the coating amount is generally adjusted so that the molar ratio of the amine salt to the polyamine reactant is about 0.1 to 4.0, preferably about 0.6 to 1.4.

In order to save a step in the process of the present invention, the above aqueous solution of the amine salt can also contain the polyamine reactant. In this case the aqueous solution is generally adjusted to a pH of about 5.5 to 9, preferably about 7 to 8. Further, in this case, the molar ratio of the amine salt to the polyamine reactant is also generally adjusted to about 0.1 to 4.0, preferably about 0.6 to 1.4.

The above aqueous solutions are coated by any well know means, such as dipping, spraying, roller coating or rod coating, and allowed to remain in place generally for about 5 seconds to 10 minutes. preferably about 20 seconds to 4 minutes.

If desired, the aqueous solutions may contain a surfactant for more improved results. The particular surfactant employed in the present invention is not critical thereto. Examples of such surfactants include sodium dodecyl benzene sulfonate (SDBS), sodium dodecyl sulfate (SDS), sodium lauryl sulfate (SLS) or mixtures thereof. The surfactants are generally employed at a concentration of about 0.01 to 0.5 wt %, preferably about 0.1 to 0.25 wt %.

After forming a liquid layer containing the amine salt and the polyamine reactant, a second layer of an organic solvent solution containing the essentially monomeric, aromatic, amine-reactive reactant is coated thereon.

Generally, the organic solvent solution contains about 0.05 to 5.0 wt/vol %, preferably about 0.1 to 0.5 wt/vol % of the amine-reactive reactant.

The organic solvent employed in the present invention is one which is non-miscible with water. The particular organic solvent employed in the present invention is not critical thereto. Examples of such organic solvents include alkanes, such as hexane and nonane: cycloalkanes, such as cyclohexane. and halogenated derivatives thereof, such as Freon ® (DuPont deNemours), including 1,1 2-trichlorotrifluoroethane; and mixtures thereof. The preferred organic solvents employed in the present invention are alkanes having from 8 to 12 carbon atoms.

The organic solvent containing the amine-reactive reactant is coated by any well known means, such as dipping or spraying and allowed to remain in place generally for about 5 seconds to 10 minutes, preferably about 20 seconds to 4 minutes.

It is preferable to employ an about 5 to 50, more preferably an about 10 to 30 molar excess of the polyamine reactant to the amine-reactive reactant.

After each step of coating the aqueous and organic solvent solutions, the excess solutions are drained off. Then, after the last coating and draining step, the resulting product is dried to form a water permeable membrane. The resulting product is generally dried in an oven at about 60° to 110° C. preferably about 70° to 100° C. for about 1 to 10 minutes, preferably about 2 to 8 minutes.

In this manner, a polyamide layer is formed on the microporous support. The thickness of the resulting polyamide layer is generally about 0.05 to 1.0 μm, preferably about 0.15 to 0.5 μm.

The following examples are provided for illustrative purposes only and are in no way intended to limit the scope of the present invention.

EXAMPLE 1

An aqueous solution containing, at a final concentration, 2.0 wt % of m-phenylenediamine (MPD), 2.0 wt % of tetramethylammonium hydroxide (TMAH), and 0.1 wt % of sodium dodecyl benzyl sulfonate (SDBS) in water was prepared. The pH of the final solution was adjusted to 5.7 with acetic acid. The solution was coated on a 60–70 μm thick microporous polysulfone support by pouring the aqueous solution on the microporous polysulfone support to form a liquid layer thereon. After coating the aqueous solution on the microporous polysulfone support and allowing it to remain thereon for 2 minutes, the support was drained to remove the excess aqueous solution. Then, an organic solvent solution containing, at a final concentration, 0.05 wt % of trimesoyl chloride (TMC) and 0.075 wt % of isophthaloyl chloride (IPC), in Isopar ® (Exxon Corp.), was coated on the liquid layer by pouring the organic solvent solution on the liquid layer and allowing it to remain for 1 minute before the support was drained to remove the excess organic solvent solution. Next, the microporous polysulfone layer coated with the above-described solutions was dried in an oven at 95° C. for 6 minutes.

The performance of the resulting water permeable membrane was measured by passing an aqueous solution containing 2,000 ppm of NaCl, pH 7.0, through the membrane at 225 psig.

The salt rejection was 99.69% and the flux was 20.1 gfd.

EXAMPLE 2

The procedure of Example 1 was repeated, except that the pH of the final solution was adjusted to 8.0 with acetic acid.

The salt rejection was 99.84% and the flux was 19.8 gfd under the same test conditions as in Example 1.

COMPARATIVE EXAMPLES A–D AND EXAMPLES 3–19

The procedure of Example 1 was repeated, except that the amine salt was omitted or the amine salts set forth in Table 1 below were substituted for TMAH in the amounts indicated in Table 1 and the strong acids in Table 1 were substituted for acetic acid so as to achieve the final pH shown in Table 1. For ease of consideration, Examples 1 and 2 are also shown in Table 1.

TABLE 1

| | Amine Salt | | | |
|---|---|---|---|---|
| | Amine | | | |
| Example | | Concentration wt% | Acid | pH |
| 1 | tetramethylammonium hydroxide | 2 | AA | 5.7 |
| 2 | tetramethylammonium | | | |

TABLE 1-continued

| Example | Amine | Concentration wt% | Acid | pH |
|---|---|---|---|---|
| | hydroxide | 2 | AA | 8.0 |
| 3 | tetramethylammonium hydroxide | 2 | CSA | 9.3 |
| 4 | dipropylamine | 2 | CSA | 7.8 |
| 5 | triethylamine | 2 | CSA | 7.8 |
| Comp. A | — | — | CSA | 7.4 |
| 6 | tripropylamine | 2 | CSA | 8.0 |
| 7 | 1-methylpiperidine | 2 | CSA | 8.0 |
| 8 | N,N—diethylmethyl-amine | 2 | CSA | 8.0 |
| 9 | N,N—dimethylethyl-amine | 2 | CSA | 8.0 |
| 10 | N,N—dimethyleth-anolamine | 2 | CSA | 8.0 |
| Comp. B | — | — | CSA | 9.0 |
| 11 | N,N—dimethyl 4-amino-pyridine | 0.32 | CSA | 5.7 |
| Comp. C | — | — | CSA | 5.7 |
| 12 | benzyltrimethyl-ammonium chloride | 2 | HCl | 7.5 |
| 13 | tetramethylammonium hydroxide | 2 | HCl | 7.4 |
| 14 | triethylamine | 2 | HCl | 8.5 |
| 15 | trimethylamine | 2 | HCl | 5.7 |
| Comp. D | — | — | HCl | 5.7 |
| 16 | 3-quinuclidinol | 0.5 | HCl | 9.0 |
| 17 | 1-methylpiperidine | 2 | MSA | 7.8 |
| 18 | tetramethylammonium hydroxide | 2 | TFAA | 7.35 |
| 19 | triethylamine | 2 | TFAA | 7.8 |

AA = acetic acid
CSA = camphorsulfonic acid
MSA = methanesulfonic acid
TFAA = trifluoroacetic acid The resulting water permeable membranes were evaluated as in Example 1 and the results are shown in Table 2 below. For ease of consideration, the results for the water permeable membranes of Examples 1 and 2 are also shown in Table 2.

TABLE 2

| Example | Salt Rejection (%) | Flux (gfd) |
|---|---|---|
| 1 | 99.69 | 20.1 |
| 2 | 99.84 | 19.8 |
| 3 | 99.90 | 16.3 |
| 4 | 99.88 | 15.8 |
| 5 | 99.87 | 22.1 |
| Comp. A | 99.81 | 5.6 |
| 6 | 99.84 | 19.8 |
| 7 | 99.88 | 20.8 |
| 8 | 99.86 | 22.3 |
| 9 | 99.91 | 19.8 |
| 10 | 99.87 | 20.7 |
| Comp. B | 99.46 | 6.2 |
| 11 | 99.64 | 17.8 |
| Comp. C | 99.82 | 15.3 |
| 12 | 99.76 | 18.5 |
| 13 | 99.90 | 16.8 |
| 14 | 99.64 | 18.9 |
| 15 | 99.66 | 16.6 |
| Comp. D | 99.76 | 13.4 |
| 16 | 99.82 | 15.5 |
| 17 | 99.26 | 15.1 |
| 18 | 99.90 | 15.9 |
| 19 | 99.87 | 21.8 |

As shown in Table 2 above, there is a significant (up to three fold or more) increase in flux using the amine salt as per the present invention without adversely effecting the salt rejection regardless of the amine salt, acid employed in the aqueous solution, or pH thereof.

EXAMPLES 20–34 AND COMPARATIVE EXAMPLES E–M

An aqueous solution was prepared containing, at a final concentration, 2.0 wt % of MPD, 6.6 wt % of amine salt of triethylamine and camphorsulfonic acid and 0.1 wt % of SDBS in water. For comparison, a similar solution was prepared without the amine salt. The pH of the final solutions was adjusted to the values as indicated in Table 3 below with camphorsulfonic acid.

The resulting aqueous solutions were coated on a 60–70 μm thick microporous polysulfone supports by pouring and allowing such to remain for 2 minutes before draining off the excess aqueous solutions.

After coating the aqueous solutions, organic solvent solutions containing, at the final concentrations set forth in Table 3, the acid chlorides set forth in Table 3, were coated thereon by pouring, allowing such to remain for 1 minute and then draining the excess organic solvent solutions. Next, the microporous polysulfone supports coated with the above-described solutions were dried in an oven under the conditions indicated in Table 3.

TABLE 3

| Example | TEACSA (wt %) | pH | Acid Chloride | Acid Chloride Concentration (wt %) | Solvent | Drying Time (min.) | Drying Temp (°C.) |
|---|---|---|---|---|---|---|---|
| 20 | 6.6 | 8.7 | TMC | 0.10 | Freon | 3.5 | 70 |
| Comp. E | — | 8.7 | TMC | 0.10 | Freon | 3.5 | 70 |
| 21 | 6.6 | 8.7 | TMC | 0.10 | Isopar | 6.0 | 95 |
| Comp. F | — | 8.7 | TMC | 0.10 | Isopar | 6.0 | 95 |
| 22 | 6.6 | 8.6 | Mixture A | 0.125 | Isopar | 6.0 | 95 |
| Comp. G | — | 8.6 | Mixture A | 0.125 | Isopar | 6.0 | 95 |
| 23 | 6.6 | 8.7 | Mixture B | 0.125 | Isopar | 6.0 | 95 |
| 24 | 6.6 | 8.7 | Mixture B | 0.125 | Freon | 3.5 | 70 |
| Comp. H | — | 8.7 | Mixture B | 0.125 | Freon | 3.5 | 70 |

The resulting water permeable membranes were evaluated as in Example 1 an the results are shown in Table 4 below.

TABLE 4

| Example | Salt Rejection (%) | Flux (gfd) |
|---|---|---|
| 20 | 99.78 | 18.4 |
| Comp. E | 99.37 | 14.2 |
| 21 | 99.80 | 19.4 |
| Comp. F | 99.84 | 5.7 |
| 22 | 99.58 | 14.1 |
| Comp. G | 99.16 | 2.6 |
| 23 | 99.85 | 26.3 |
| 24 | 99.25 | 20.0 |
| Comp. H | 98.35 | 10.2 |
| 25 | 99.69 | 19.3 |
| Comp. I | 99.63 | 16.3 |

TABLE 4-continued

| Example | Salt Rejection (%) | Flux (gfd) |
| --- | --- | --- |
| 26 | 99.79 | 20.1 |
| 27 | 99.81 | 22.6 |
| 28 | 99.78 | 18.8 |
| 29 | 99.83 | 20.7 |
| Comp. J | 99.72 | 5.0 |
| 30 | 99.84 | 25.8 |
| Comp. K | 99.75 | 7.7 |
| 31 | 99.60 | 21.9 |
| Comp. L | 99.50 | 12.2 |
| 32 | 99.45 | 21.2 |
| Comp. M | 99.63 | 6.2 |

As shown in Table 4 above, there is a significant (up to three fold or more) increase in flux using the amine salt as per the present invention without adversely effecting the salt rejection, regardless of the particular organic solvent solution and pH of the aqueous solution employed.

While the invention has been described in detail and with reference to specific embodiments thereof, it will be apparent to one skilled in the art that various changes and modifications can be made therein without departing from the spirit and scope thereof.

What is claimed is:

1. A water permeable membrane prepared by interfacially polymerizing, on a microporous support, (1) an essentially monomeric, aromatic polyamine reactant having at least two amine functional groups, and (2) an essentially monomeric, aromatic, amine-reactive reactant comprising a polyfunctional acyl halide or mixture thereof, wherein the amine-reactive reactant has, on the average, at least about 2.2 acyl halide groups per reactant molecule, in the presence of (3) a monomeric amine salt.

2. The water permeable membrane as claimed in claim 1, wherein said water permeable membrane is produced by the process comprising the steps of:
    (a) coating a microporous support with an aqueous solution comprising (i) an essentially monomeric, aromatic, polyamine reactant having at least two amine functional groups and (ii) a monomeric amine salt, to form a liquid layer on said microporous support;
    (b) contacting said liquid layer with an organic solvent solution of an essentially monomeric, aromatic, amine-reactive reactant comprising a polyfunctional acyl halide or mixture thereof, wherein the amine-reactive reactant has, on the average, at least about 2.2 acyl halide groups per reactant molecule: and
    (c) drying the product of step (b) so as to form said water permeable membrane.

3. The water permeable membrane as claimed in claim 2, wherein said aqueous solution has a pH of about 5.5 to 9.

4. The water permeable membrane as claimed in claim 3, wherein said aqueous solution has a pH of about 7 to 8.

5. The water permeable membrane as claimed in claim 2, wherein the concentration of the amine-reactive reactant in the organic solvent solution is about 0.05 to 5 wt/vol %.

6. The water permeable membrane as claimed in claim 5, wherein the concentration of the amine-reactive reactant in the organic solvent solution is about 0.1 to 0.5 wt/vol %.

7. The water permeable membrane as claimed in claim 1, wherein said water permeable membrane is produced by the process comprising the steps of:
    (a) coating a microporous support with a first aqueous solution comprising a monomeric amine salt to form an amine salt layer on said microporous support;
    (b) coating said monomeric amine salt layer with a second aqueous solution comprising an essentially monomeric, aromatic, polyamine reactant having at least two amine functional groups to form a liquid layer on said monomeric amine salt layer;
    (c) coating said liquid layer with an organic solvent solution of an essentially monomeric, aromatic, amine-reactive reactant comprising a polyfunctional acyl halide or mixture thereof, wherein said amine-reactive reactant has, on the average, at least about 2.2 acyl halide groups per molecule; and
    (d) drying the product of step (c) so as to form said water permeable membrane.

8. The water permeable membrane as claimed in claim 7, wherein said first aqueous solution has a pH of about 5.5 to 9.

9. The water permeable membrane as claimed in claim 8, wherein said first aqueous solution has a pH of about 7 to 8.

10. The water permeable membrane as claimed in claim 7, wherein said second aqueous solution has a pH of about 5 to 10.

11. The water permeable membrane as claimed in claim 10, wherein said second aqueous solution has a pH of about 7 to 9.

12. The water permeable membrane as claimed in claim 7, wherein said monomeric first aqueous solution contains about 0.25 to 10.0 wt % of said amine salt.

13. The water permeable membrane as claimed in claim 12, wherein said monomeric first aqueous solution contains about 1.0 to 8.0 wt % of said amine salt.

14. The water permeable membrane as claimed in claim 7, wherein the concentration of the amine-reactive reactant in the organic solvent solution is about 0.05 to 5.0 wt/vol %.

15. The water permeable membrane as claimed in claim 14, wherein the concentration of the amine-reactive reactant in the organic solvent solution is about 0.1 to 0.5 wt/vol %.

16. The water permeable membrane as claimed in claim 1, wherein the amine used to prepare said monomeric amine salt has a pKa of at least about 8.

17. The water permeable membrane as claimed in claim 16, wherein the amine used to prepare said monomeric amine salt has a pKa of at least about 8 to 13.

18. The water permeable membrane as claimed in claim 17, wherein the amine used to prepare said monomeric amine salt has a pKa of at least about 9 to 13.

19. The water permeable membrane as claimed in claim 1, wherein said monomeric amine salt is represented by formula (I) or (II)

-continued

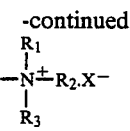

(II)

wherein $R_1$, $R_2$, $R_3$ and $R_4$, which may be the same or different, each represents a hydrocarbon; X represents a member selected from the group consisting of a halide, a nitrate, a sulfate, a phosphate, a sulfonate, a carboxylate, a halogenated carboxylate and an oxygenated haloacid derivative; and HX represents a strong acid which forms a water soluble salt with

20. The water permeable membrane as claimed in claim 19, wherein said strong acid is selected from the group consisting of an aromatic sulfonic acid; an aliphatic sulfonic acid; a cycloaliphatic sulfonic acid; trifluoroacetic acid; nitric acid; hydrochloric acid; and sulfuric acid.

21. The water permeable membrane as claimed in claim 1, wherein said monomeric amine salt is a water soluble salt of a strong acid and a tertiary amine selected from at least one member of the group consisting of a trialkylamine; an N-alkyl cycloaliphatic amine; an N,N-dialkylamine; N,N-dialkylethanolamine and a bicyclic tertiary amine, or a quaternary amine selected from at least one member of the group consisting of a tetraalkylammonium hydroxide; and a benzyltrialkylammonium hydroxide; and mixtures thereof.

22. The water permeable water membrane as claimed in claim 21, wherein said monomeric amine salt is a water soluble salt of a strong acid and triethylamine.

23. The water permeable membrane as claimed in claim 1, wherein said amine-reactive reactant is at least one member selected from the group consisting of isophthaloyl halide, trimesoyl halide and terephthaloyl halide.

24. The water permeable membrane as claimed in claim 1, wherein said amine functional groups are primary amine functional groups.

25. The water permeable membrane as claimed in claim 1, wherein said polyamine reactant is at least one member selected from the group consisting of an aromatic primary diamine and substituted derivatives thereof; a cycloaliphatic primary diamine; a cycloaliphatic secondary diamine; an aromatic secondary diamine and xylylene diamine.

26. The water permeable membrane as claimed in claim 1, wherein the molar ratio of the monomeric amine salt to the polyamine reactant is about 0.1 to 4.0.

27. The water permeable membrane as claimed in claim 26, wherein the molar ratio of the monomeric amine salt to the polyamine reactant is about 0.6 to 1.4.

28. The water permeable membrane as claimed in claim 1, wherein an about 5 to 50 molar excess of the polyamine reactant to the amine-reactive reactant is employed.

29. The water permeable membrane as claimed in claim 28, wherein an about 10 to 30 molar excess of the polyamine reactant to the amine-reactive reactant is employed.

30. A process for producing a water permeable membrane comprising interfacially polymerizing, on a microporous support, (1) an essentially monomeric, aromatic polyamine reactant having at least two amine functional groups, and (2) an essentially monomeric, aromatic, amine-reactive reactant comprising a polyfunctional acyl halide or mixture thereof, wherein the amine-reactive reactant has, on the average, at least about 2.2 acyl halide groups per reactant molecule, in the presence of (3) a monomeric amine salt.

31. The process as claimed in claim 30, wherein said water permeable membrane is produced by the process comprising the steps of:
(a) coating a microporous support with an aqueous solution comprising (i) an essentially monomeric, aromatic, polyamine reactant having at least two amine functional groups and (ii) a monomeric amine salt, to form a liquid layer on said microporous support;
(b) contacting said liquid layer with an organic solvent solution of an essentially monomeric, aromatic, amine-reactive reactant comprising a polyfunctional acyl halide or mixture thereof, wherein the amine-reactive reactant has, on the average, at least about 2.2 acyl halide groups per reactant molecule; and
(c) drying the product of step (b) so as to form said water permeable membrane.

32. The process as claimed in claim 31, wherein said aqueous solution has a pH of about 5.5 to 9.

33. The process as claimed in claim 32, wherein said aqueous solution has a pH of about 7 to 8.

34. The process as claimed in claim 31, wherein the concentration of the amine-reactive reactant in the organic solvent solution is about 0.05 to 5 wt/vol %.

35. The process as claimed in claim 34, wherein the concentration of the amine-reactive reactant in the organic solvent solution is about 0.1 to 0.5 wt/vol %.

36. The process as claimed in claim 34, wherein the concentration of the amine-reactive reactant in the organic solvent solution is about 0.1 to 0.5 wt/vol %.

37. The process as claimed in claim 30, wherein said water permeable membrane is produced by the process comprising the steps of:
(a) coating a microporous support with a first aqueous solution comprising a monomeric amine salt to form a monomeric amine salt layer on said microporous support;
(b) coating said monomeric amine salt layer with a second aqueous solution comprising an essentially monomeric, aromatic, polyamine reactant having at least two amine functional groups to form a liquid layer on said monomeric amine salt layer;
(c) coating said liquid layer with an organic solvent solution of an essentially monomeric, aromatic, amine-reactive reactant comprising a polyfunctional acyl halide or mixture thereof, wherein said amine-reactive reactant has, on the average, at least about 2.2 acyl halide groups per molecule; and
(d) drying the product of step (c) so as to form said monomeric water permeable membrane.

38. The process as claimed in claim 37, wherein said first aqueous solution has a pH of about 5.5 to 9.

39. The process as claimed in claim 38, wherein said first aqueous solution has a pH of about 7 to 8.

40. The process as claimed in claim 37, wherein said second aqueous solution has a pH of about 5 to 10.

41. The process as claimed in claim 40, wherein said second aqueous solution has a pH of about 7 to 9.

42. The process as claimed in claim 37, wherein said first aqueous solution contains about 0.25 to 10.0 wt % of said monomeric amine salt.

43. The process as claimed in claim 42, wherein said first aqueous solution contains about 1.0 to 8.0 wt % of said monomeric amine salt.

44. The process as claimed in claim 37, wherein the concentration of the amine-reactive reactant in the organic solvent solution is about 0.05 to 5 wt/vol %.

45. The process as claimed in claim 30, wherein the amine used to prepare said amine salt has a pKa of at least about 8.

46. The process as claimed in claim 45, wherein the amine used to prepare said monomeric amine salt has a pKa of at least about 8 to 13.

47. The process as claimed in claim 46, wherein the amine used to prepare said monomeric amine salt has a pKa of at least about 9 to 13.

48. The process as claimed in claim 30, wherein said monomeric amine salt is represented by formula (I) or (II)

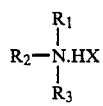
(I)

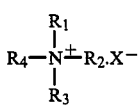
(II)

wherein $R_1$, $R_2$, $R_3$ and $R_4$, which may be the same or different, each represents a hydrocarbon; X represents a member selected from the group consisting of a halide, a nitrate, a sulfate, a phosphate, a sulfonate, a carboxylate, a halogenated carboxylate and an oxygenated haloacid derivative; and HX represents a strong acid which forms a water soluble salt with

49. The process as claimed in claim 48, wherein said strong acid is selected from the group consisting of an aromatic sulfonic acid; an aliphatic sulfonic acid; a cycloaliphatic sulfonic acid; trifluoroacetic acid; nitric acid; hydrochloric acid; and sulfuric acid.

50. The process as claimed in claim 30, wherein said monomeric amine salt is a water soluble salt of a strong acid and a tertiary amine selected from at least one member of the group consisting of a trialkylamine: an N-alkyl cycloaliphatic amine; an N,N-dialkylamine; N,N-dialkylethanolamine and a bicyclic tertiary amine, or a quaternary amine selected from at least one member of the group consisting of a tetraalkylammonium hydroxide, and a benzyl trialkylammonium hydroxide; and mixtures thereof.

51. The process as claimed in claim 50, wherein said monomeric amine salt is a water soluble salt of a strong acid and triethylamine.

52. The process as claimed in claim 30, wherein said amine-reactive reactant is at least one member selected from the group consisting of isophthaloyl halide, trimesoyl halide, and terephthaloyl halide.

53. The water permeable membrane as claimed in claim 30, wherein said amine functional groups are primary amine functional groups.

54. The process as claimed in claim 30, wherein said polyamine reactant is at least one member selected from the group consisting of an aromatic primary diamine and substituted derivatives thereof; a cycloaliphatic primary diamine; a cycloaliphatic secondary diamine; an aromatic secondary diamine and xylylene diamine.

55. The process as claimed in claim 30, wherein the molar ratio of the monomeric amine salt to the polyamine reactant is about 0.1 to 4.0.

56. The process as claimed in claim 55, wherein the molar ratio of the monomeric amine salt to the polyamine reactant is about 0.6 to 1.4.

57. The process as claimed in claim 30, wherein an about 5 to 50 molar excess of the polyamine reactant to the amine-reactive reactant is employed.

58. The process as claimed in claim 57, wherein an about 10 to 30 molar excess of the polyamine reactant to the amine-reactive reactant is employed.

* * * * *

UNITED STATES PATENT AND TRADEMARK OFFICE
CERTIFICATE OF CORRECTION

PATENT NO. : 4,872,984
DATED : October 10, 1989
INVENTOR(S) : JOHN E. TOMASCHKE

It is certified that error appears in the above-identified patent and that said Letters Patent is hereby corrected as shown below:

On the cover sheet of the patent, under "U.S. Patent Documents", change "Fbiger" to -- Fibiger --.

At column 8, delete Table 3 in its entirety and insert therefore the following: (as shown on the attached sheet)

Signed and Sealed this

Thirtieth Day of October, 1990

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,872,984
DATED : October 10, 1989
INVENTOR(S) : JOHN E. TOMASCHKE

It is certified that error appears in the above-identified patent and that said Letters Patent is hereby corrected as shown below:

Table 3

| Example | TEACSA (wt%) | pH | Acid Chloride | Acid Chloride Concentration (wt%) | Solvent | Drying Time (min.) | Drying Temp (°C) |
|---|---|---|---|---|---|---|---|
| 20 | 6.6 | 8.7 | TMC | 0.10 | Freon | 3.5 | 70 |
| Comp. E | - | 8.7 | TMC | 0.10 | Freon | 3.5 | 70 |
| 21 | 6.6 | 8.7 | TMC | 0.10 | Isopar | 6.0 | 95 |
| Comp. F | - | 8.7 | TMC | 0.10 | Isopar | 6.0 | 95 |
| 22 | 6.6 | 8.6 | Mixture A | 0.125 | Isopar | 6.0 | 95 |
| Comp. G | - | 8.6 | Mixture A | 0.125 | Isopar | 6.0 | 95 |
| 23 | 6.6 | 8.7 | Mixture B | 0.125 | Isopar | 6.0 | 95 |
| 24 | 6.6 | 8.7 | Mixture B | 0.125 | Freon | 3.5 | 70 |
| Comp. H | - | 8.7 | Mixture B | 0.125 | Freon | 3.5 | 70 |
| 25 | 6.6 | 8.7 | TMC | 0.125 | Freon | 3.5 | 70 |
| Comp. I | - | 8.7 | TMC | 0.125 | Freon | 3.5 | 70 |
| 26 | 6.6 | 7.0 | Mixture B | 0.125 | Freon | 6.0 | 95 |
| 27 | 6.6 | 7.0 | Mixture B | 0.25 | Freon | 6.0 | 95 |
| 28 | 6.6 | 7.0 | Mixture B | 0.25 | Freon | 3.5 | 70 |
| 29 | 6.6 | 7.0 | Mixture C | 0.125 | Freon | 3.5 | 70 |
| Comp. J | - | 7.0 | Mixture C | 0.125 | Freon | 3.5 | 70 |
| 30 | 6.6 | 7.0 | Mixture C | 0.125 | Isopar | 6.0 | 95 |
| Comp. K | - | 7.0 | Mixture C | 0.125 | Isopar | 6.0 | 95 |
| 31 | 6.6 | 7.0 | Mixture B | 0.125 | Freon | 3.5 | 70 |
| Comp. L | - | 7.0 | Mixture B | 0.125 | Freon | 3.5 | 70 |
| 32 | 6.6 | 7.0 | Mixture B | 0.125 | Isopar | 6.0 | 95 |
| Comp. M | - | 7.0 | Mixture B | 0.125 | Isopar | 6.0 | 95 |

TEACSA = amine salt of triethylamine and camphorsulfonic acid.
Mixture A = a mixture of 70wt% IPC and 30wt% TMC.
Mixture B = a mixture of 60wt% IPC and 40wt% TMC.
Mixture C = a mixture of 50wt% IPC and 50wt% TMC.